Figure 1A:
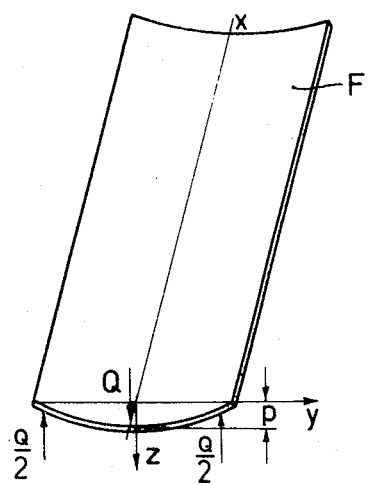

United States Patent [19]
Landvogt

[11] 3,733,890
[45] May 22, 1973

[54] APPARATUS FOR LINEARLY CONVERTING A MECHANICAL QUANTITY INTO A FREQUENCY

[75] Inventor: Günther Friedrich Landvogt, Hamburg 61, Germany

[73] Assignee: U.S. Philips Corporation, New York, N.Y.

[22] Filed: May 24, 1971

[21] Appl. No.: 146,170

[30] Foreign Application Priority Data

May 26, 1970 Germany..................P 20 25 654.6

[52] U.S. Cl..................73/67.2, 73/88 R, 73/100
[51] Int. Cl.................................G01n 3/32
[58] Field of Search..................73/DIG. 1, 70.2, 73/517 AV, 67.2, 88 R, 100

[56] References Cited

UNITED STATES PATENTS

| | | | |
|---|---|---|---|
| 3,479,536 | 11/1969 | Norris | 73/517 AV X |
| 2,519,015 | 8/1950 | Bensen | 73/194 B UX |
| 3,174,331 | 3/1965 | Doherty et al. | 73/70.2 |
| 3,489,161 | 1/1970 | Rexford | 137/82 |
| 3,457,938 | 7/1969 | Taplin et al. | 137/82 |

*Primary Examiner*—Jerry W. Myracle
*Attorney*—Frank R. Trifari

[57] ABSTRACT

The invention relates to an apparatus for linearly converting a mechanical quantity into a frequency, which apparatus comprises a body which is capable of vibrating and is set into vibration at its resonant frequency by a vibration generator, a device for changing the resonant frequency by changing the bending stiffness of the body, and a device for indicating the frequency, the said body being a leaf spring and the quantity to be measured causing bending of this leaf spring in a transverse direction.

8 Claims, 6 Drawing Figures

APPARATUS FOR LINEARLY CONVERTING A MECHANICAL QUANTITY INTO A FREQUENCY

The invention relates to an apparatus for linearly converting a mechanical quantity into a frequency, which apparatus comprises a body which is capable of vibrating and is set into vibration at its resonant frequency by a vibration generator, a device for changing the resonant frequency by changing the bending stiffness of the body, and a device for indicating the frequency.

Pre-published German Pat. application No. 1,938,208 (corresponding to U.S. Pat. No. 3,489,161) describes a spring-mass system having a variable resonant frequency, in which a tubular thin-walled element of highly elliptical cross-section is subjected to an internal pressure. The bending stiffness and hence the resonant frequency of the element depend upon the internal pressure. This known system is used for frequency reference. Owing to the small frequency sweep obtainable and the insufficient linearity, however, this system is unsuitable for measuring forces and displacements or other physical quantities which may be reduced thereto. In addition the construction of this system is highly complicated.

It is an object of the present invention to provide an apparatus for frequency-analogous measurement of forces, displacements or of physical quantities which involve a force or a displacement, which apparatus does not have the said disadvantages.

According to the invention, this is obtained in that the vibratory body is a leaf spring and the quantity to be measured produces bending of the cross-section of this leaf spring.

Advantageously the point of application of the quantity to be measured is variable in the axial direction of the leaf spring, whilst means may be provided to damp the non-vibrating, free end.

The bending may be effected by bending moments applied to the longer edges of the leaf spring, by transverse forces, applied to the center of the cross-section or by transverse forces directed towards one another and exerted on the longer edges.

In the simplest case the leaf spring has the form of a thin, rectangular and homogeneous plate. However, it may be of advantage for the spring to have a non-uniform thickness or width. Further, the leaf spring may be made so as to have an initial bending.

Preferably the leaf spring is made, at least partly, of a piezo-electric or magnetostrictive material.

Figure 1B:
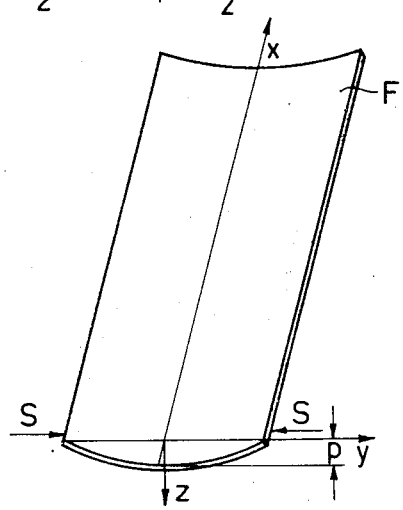
Figure 1C:
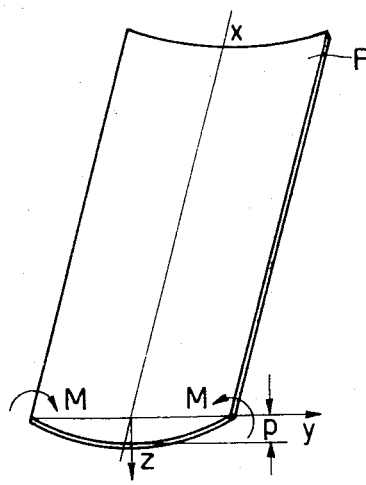
Figure 2:
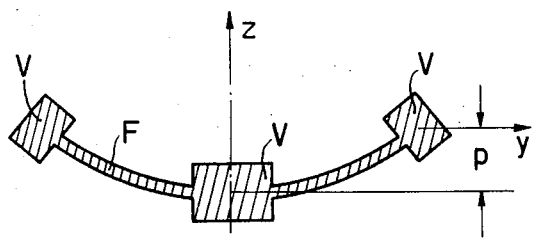
Figure 3:
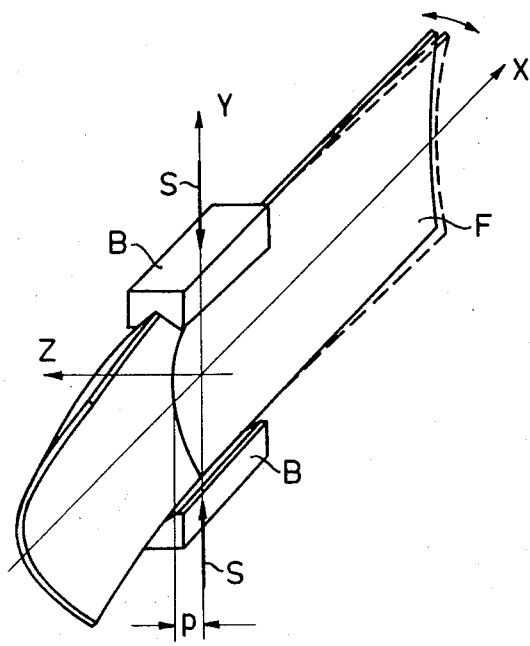
Figure 4:
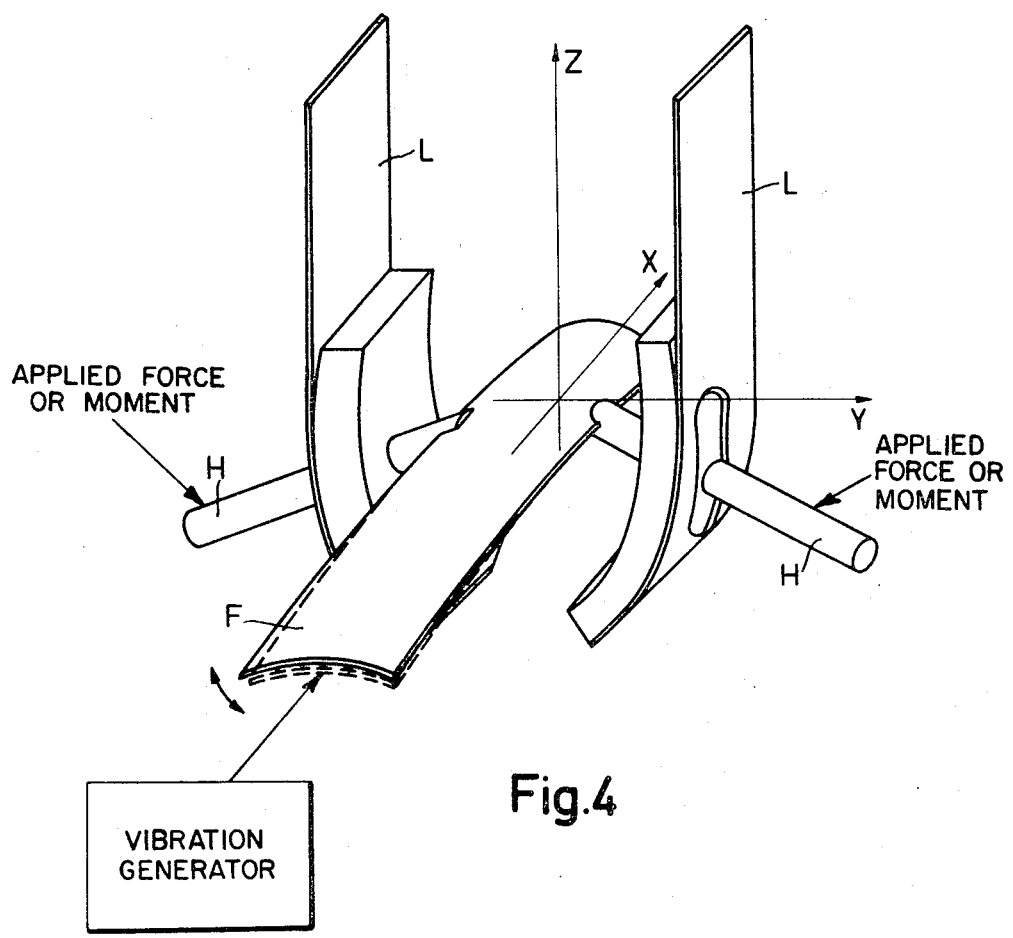

Embodiments of the invention will now be described, by way of example, with reference to the accompanying diagrammatic drawings, in which FIGS. 1a, 1b and 1c show an embodiment of a vibratory body in the form of an elongate vaulted leaf spring, FIG. 2 is a cross-sectional view of another embodiment of the leaf spring of FIG. 1, FIG. 3 shows the leaf spring of FIG. 1 mounted in a first embodiment of a clamping device, and FIG. 4 shows the leaf spring of FIG. 1 in a second embodiment of a clamping device.

When the vibratory body in the widest sense of technical mechanics has the shape of a beam, the bending vibrations which it may perform have the natural frequencies $$f_n = k_n \cdot \sqrt{E \cdot I / \mu} \; ; \; n = 1, 2, 3, \ldots$$

In this expression $E$ is the modulus of elasticity, $\mu$ is the mass per unit length, $I$ is the moment of inertia of the cross-sectional area around the neutral axis of the beam, and $k_n$ is a constant which is determined by the boundary conditions and the length of the beam. The quantity $E \cdot I$ is referred to as the bending stiffness. In the first instance, this relation applies only to a homogeneous beam, i.e., for the case in which the material properties and the cross-sectional area do not depend on the longitudinal coordinate $x$ (FIG. 1). When the cross-sectional area is different at different locations, $\mu$ and $I$ will generally be functions of $x$, for example $\mu = \mu_0 \cdot u(x)$ and $I = I_0 \cdot v(x)$. Computing the natural frequencies $f_n$ now involves a Sturm-Liouville eigenvalue problem. From the theory developed with respect to this problem there formally follows the same law as for the homogeneous beam:

$$f_n = k_n' \cdot \sqrt{E \cdot I_0 / \mu_0},$$

with the difference that now the constant $k_n'$ is also determined by $u(x)$ and $v(x)$. Hence, the following considerations apply to the inhomogeneous beam and include the homogeneous beam as a special case.

A decisive factor for the use of a vibrating beam as a source of measuring quantities is the possibility of varying the moment of inertia $I = I_0 \cdot v(x)$ by deformation of the cross-sectional area. As an example, we will use the leaf spring F according to the invention, the cross-sectional area of which is a slender rectangle. In this spring, the cross-sectional area may be deformed by transverse forces Q as shown in FIG. 1a, by lateral forces S as shown in FIG. 1b or by bending moments M as shown in FIG. 1c. The quantities $E$ and $\mu = \mu_0 \cdot u(x)$ are retained. In the case of not excessively large deformations, $v(x)$ will also be retained for reasons of the theory of elasticity and geometry, only being changed $I_0$. Thus, $f_n \approx \sqrt{I_0}$. The greater the bending $p$, the greater will be $I_0$, as expressed by the theorem of Steiner:

$$I_0 = I_{oe} + c \cdot A \cdot p^2,$$

where $I_{oe}$ is the moment of inertia of the non-deformed body, $A$ is the cross-sectional area and $c$ is a constant following from the elastic curve. When the cross-section is a rectangle of width $b$ and height $\delta$, then $$I_{oe} = 1/12 \cdot b \cdot \delta^3 = 1/12 \cdot A \cdot \delta^2$$

and hence $$f_n = k_n' \cdot \sqrt{E/\mu} \cdot \sqrt{c \cdot b \cdot \delta \cdot p} \cdot \sqrt{1 + (1/12c) \cdot (\delta)^2 / p}$$

Assuming the elastic curve to obey the law $z = p \cdot \cos \pi X / 2b$, then $c \approx 0.08 \approx 1/12$ and $$f_n \approx k'_n \cdot \sqrt{E/\mu} \cdot \sqrt{b \delta / 12 \cdot p} \cdot \sqrt{1 + (\delta)^2 / p}$$

Consequently, for $a \gg \delta$ the natural frequencies increase substantially in proportion to the deflection $p$, whilst the relative linearity error is $\approx \frac{1}{2} (\delta)^2 / p$. Hence, in order to obtain satisfactory linearity the deflection $p$ must always be greater than the thickness of the leaf spring.

In order to obtain a satisfactory linearity in the vicinity of the zero point, a leaf spring may be used which owing to its construction or to a mechanical initial tension will already have a sufficiently large bending $p_0$ in the absence of a measuring quantity. A suitable choice of the cross-section, for example similar to that shown in FIG. 2, enables the factor $c$ to be increased and to approach the limiting value $c = \frac{1}{4}$.

When the bending $p$ locally reaches the order of one half of the width of the vibrating body, for reasons of geometry the function $v(x)$, which indicates the dependence of the moment of inertia on the location, will no longer be independent of $p$, so that in this range $k_n'$ will be changed. As a result, the frequency of the measuring-quantity source will increase to a lesser degree than is indicated by the simplified theory. In sources of force similar effects are produced by the fact that in the cases of bending of such large values, there will no longer be proportionality between $p$ and the transverse forces or bending moments producing this bending. In sources of force the said two effects may be compensated for in that the deforming force is made to act entirely or in part as a lateral force, for the deflection $p$ increases more than proportionally with the deforming lateral force, as is known from the Euler formula for buckling loads.

FIG. 3 shows a leaf spring mounted in a clamping device B which exerts lateral forces S on the leaf spring F. The bending $p$ and hence the natural resonance of the leaf spring F vary according to the values of the lateral forces S. To cause the leaf spring to perform bending vibrations in the direction of the double-headed arrow requires the use of known electromechanical transducers, not shown.

FIG. 4 shows another embodiment of the clamping device for the leaf spring by which bending moments are exerted on the leaf spring F. In two mounting supports L (of any suitable shape) there are mounted two levers H which each at one end engage an edge of the leaf spring, whilst the other ends are subjected to the influence of external forces. This also ensures variable bending of the leaf spring.

If the leaf spring is entirely or partially made of a piezo-electric or magnetostrictive material, one or several transducers which are required to produce the vibrations or serve some other purpose may be manufactured in one operation with the vibrator. Thus, a smaller mechanical size and a reduced expenditure are obtainable.

What we claim is:

1. Apparatus for measuring frequency and ascertaining a mechanical quantity that has been linearly converted into said frequency, comprising:
    A. a bendable element so fixtured so as to act as a vibratory body;
    B. means to cause said bendable element to vibrate at its resonant frequency;
    C. means to vary the bending stiffness in a transverse cross-section of said bendable element by exerting thereupon a mechanical quantity, which results in a corresponding variation in said frequency; and
    D. means to measure said frequency to ascertain said mechanical quantity.

2. The apparatus of claim 1, wherein the means to vibrate said bendable element is a vibration generator.

3. The apparatus of claim 1, wherein said bendable element is a leaf spring.

4. The apparatus of claim 1, further comprising means to damp said bendable element.

5. The apparatus of claim 1, wherein said bendable element has a plurality of axes and is of varying dimensionality along at least one of said axes.

6. The apparatus of claim 1, wherein said bendable element is composed of a magnetostrictive material.

7. The apparatus of claim 1, wherein the bendable element has an initial bend.

8. The apparatus of claim 1, wherein said bendable element is composed of a piezo-electric material.

* * * * *